N. BOLERATZ.
COFFEE POT.
APPLICATION FILED OCT. 6, 1915.
1,210,590. Patented Jan. 2, 1917.
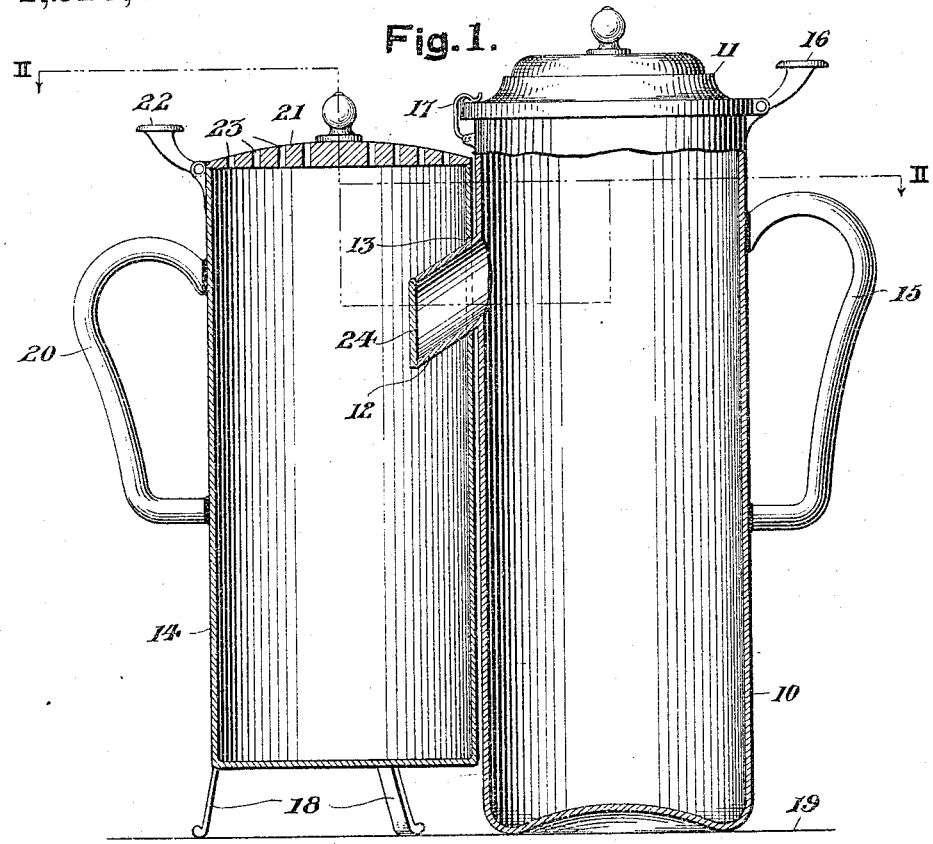
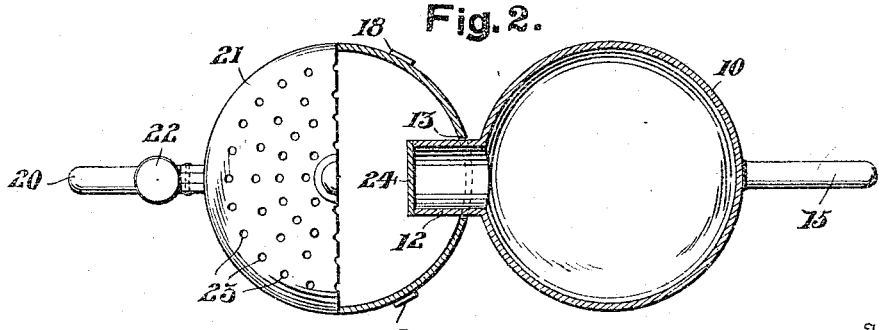

UNITED STATES PATENT OFFICE.

NORINE BOLERATZ, OF DETROIT, MICHIGAN.

COFFEE-POT.

1,210,590. Specification of Letters Patent. Patented Jan. 2, 1917.

Application filed October 6, 1915. Serial No. 54,382.

*To all whom it may concern:*

Be it known that I, NORINE BOLERATZ, a citizen of the United States, residing at Detroit, in the county of Wayne and State of Michigan, have invented certain new and useful Improvements in Coffee-Pots, of which the following is a specification.

This invention relates to certain new and useful improvements in coffee pots.

The primary object of this invention is the provision of a coffee boiler adapted for operation in a closed condition and having means for preventing liquid from boiling over, whereby a more perfect beverage is produced.

A further object of the invention is the provision of a device that is inexpensive to manufacture and capable of producing a more perfect grade of beverage and which is so arranged as to prevent any boiling over of the fluid during the operation thereof.

A still further object is the provision of an arrangement of closed boiler for preparing a beverage, the same having a detachable auxiliary chamber for receiving any of the beverage that may boil over during the preparation thereof, the members of the device being readily separable and easily cleaned.

With these general objects in view and others that will appear as the nature of the invention is better understood, the same consists in the novel combination and arrangement of parts hereinafter more fully described, illustrated in the accompanying drawings, and pointed out in the appended claim.

In the drawings forming a part of this application and in which like designating characters refer to corresponding parts throughout the several views:—Figure 1 is a view of the complete device partly in side elevation and partly in central longitudinal section, and Fig. 2 is a sectional view taken upon line II—II of Fig. 1.

Referring more in detail to the drawings, the device broadly consists of a boiler or container 10 having a hinged lid 11 mounted thereon, and provided with a downwardly inclined side outlet spout 12 normally projecting through a side opening 13 inwardly of a drip cup 14.

The boiler 10 is provided with a side handle 15, while the lid 11 thereof is provided with a thumb-operating lever 16 and is adapted to be retained in closed position by means of a resilient hinged hook or clasp 17.

The drip cup 14 is preferably mounted upon feet 18 so as to elevate the same above the supporting heater upon which the boiler 10 is seated and which is designated as 19 in Fig. 1 of the present drawings.

A side handle 20 is provided for the said drip cup, while a hinged cover 21 is mounted at the top thereof and adapted to be opened by means of a laterally projecting lever 22, the said cover being provided with a plurality of steam outlet perforations 23 therethrough.

From this detailed description of the device, the complete operation of the same will be at once apparent, the coffee and fluid to be boiled being placed within the boiler 10 and seated upon the heater or stove 19 with the clasp 17 securely retaining the boiler lid 11 in its normal position and with the spout 12 of the boiler extending within the drip cup 14. A relatively heavy closure disk 24 being arranged over the open end of the boiler spout 10, the boiler is thereby closed during the operation thereof and upon an excess of steam within the boiler, the disk 24 will be slightly swung open allowing the steam to escape into the drip cup 14, while any rising of the boiler fluid within the boiler 10 above the level of the spout 12 will allow the fluid to drip or flow over into the cup 14 provided for that purpose. This arrangement therefore completely prevents any boiling over of the fluid so as to be precipitated upon the heater 19 or upon the exterior of either the boiler or the drip cup, it being understood that the cover openings 23 of the cup are the only means provided for the escape of the steam.

While the form of the invention herein shown and described is what is believed to be the preferred embodiment thereof, it is nevertheless to be understood that minor changes may be made therein without departing from the spirit and scope of the invention as claimed.

What I claim as new is:—

A device of the class described comprising a coffee boiler, a hinged lid upon said boiler, a retaining clasp for the said lid, a downwardly inclined outlet spout for the said boiler, a relatively heavy normally closed swinging closure disk for the said spout, a drip cup provided with a side opening having the said spout removably extending inwardly therethrough, the said drip cup being slightly spaced from the boiler, a hinged cover for the said drip cup provided with a plurality of outlet perforations therethrough, and operating levers for the said cover and lid.

In testimony whereof I affix my signature in presence of two witnesses.

NORINE BOLERATZ.

Witnesses:
W. J. McMICHAEL,
J. R. LAWRENCE.

Copies of this patent may be obtained for five cents each, by addressing the "Commissioner of Patents, Washington, D. C."